US009647408B2

(12) United States Patent
Lowell (10) Patent No.: US 9,647,408 B2
(45) Date of Patent: May 9, 2017

(54) SYSTEM AND METHOD TO PRODUCE TUNABLE SYNTHESIZED OPTICAL FREQUENCY

(71) Applicant: The Boeing Company, Chicago, IL (US)

(72) Inventor: John R. Lowell, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 193 days.

(21) Appl. No.: 14/531,010

(22) Filed: Nov. 3, 2014

(65) Prior Publication Data

US 2016/0124285 A1    May 5, 2016

(51) Int. Cl.
| | | |
|---|---|---|
| *G02F 1/01* | (2006.01) | |
| *H01S 3/00* | (2006.01) | |
| *H01S 3/13* | (2006.01) | |

(52) U.S. Cl.
CPC .......... *H01S 3/0078* (2013.01); *G02F 1/0121* (2013.01); *H01S 3/005* (2013.01); *H01S 3/13* (2013.01)

(58) Field of Classification Search
CPC . G02F 1/01; G02F 1/0121; G02F 1/35; H01S 3/005; H01S 3/0078; H01S 3/13
See application file for complete search history.

(56) References Cited

U.S. PATENT DOCUMENTS

| | | | | |
|---|---|---|---|---|
| 6,493,091 B2 * | 12/2002 | Kourogi | ............. | G01N 21/4795 |
| | | | | 356/489 |
| 6,785,303 B1 | 8/2004 | Holzwarth | | |
| 8,384,990 B2 * | 2/2013 | Vodopyanov | ............. | G02F 1/39 |
| | | | | 359/330 |
| 8,416,819 B2 * | 4/2013 | Grebing | .................... | G02F 1/33 |
| | | | | 372/23 |
| 2008/0285606 A1 * | 11/2008 | Kippenberg | ............. | G02F 1/39 |
| | | | | 372/32 |

OTHER PUBLICATIONS

M. A. Foster, J. S. Levy, O. Kuzucu, K. Saha, M. Lipson, and A. L. Gaeta; "Silicon-based monolithic optical frequency comb source"; Opt. Express 19, 14233 (2011).
Y. Okawachi, K. Saha, J. S. Levy, Y. H. Wen, M. Lipson, and A. L. Gaeta; "Octave-spanning frequency comb generation on a silicon nitride chip"; Opt. Lett. 36, 3398 (2011).

(Continued)

*Primary Examiner* — Daniel Petkovsek
(74) *Attorney, Agent, or Firm* — Miller, Matthias & Hull LLP (57) ABSTRACT

A control circuit for generating an optical output at a target frequency using a single-frequency laser is provided. The control circuit includes a micro-ring resonator configured to generate a frequency comb of a plurality of comb frequencies based on a source frequency, a carrier-envelope offset interferometer configured to determine a carrier-envelope offset frequency of the frequency comb, a tunable filter configured to select a subset of comb frequencies of the frequency comb based on the target frequency, and a spectrometer configured to resolve ambiguities in overlap between the subset of comb frequencies and the frequency comb, and refine the subset of comb frequencies to a single comb frequency for output.

20 Claims, 4 Drawing Sheets

(56) References Cited

OTHER PUBLICATIONS

K. Saha, Y. Okawachi, B. Shim, J. S. Levy, M. A. Foster, R. Salem, A. R. Johnson, M. R. E. Lamont, M. Lipson, and A. L. Gaeta; "Modelocking and femtosecond pulse generation in chip-based frequency combs"; Opt. Express 21, 1335-1343 (2013).
5. A. R. Johnson, Y. Okawachi, J. S. Levy, J. Cardenas, K. Saha, M. Lipson, and A. L. Gaeta; "Chip-based frequency combs with sub-100 GHz repetition rates"; Opt. Lett. 37, 875 (2012).
6. K. Padmaraju, D. F. Logan, T. Shiraishi, J. J. Ackert, A. P. Knights, K. Bergman; "Wavelength Locking and Thermally Stabilizing Microring Resonators using Dithering Signals"; IEEE/OSA Journal of Lightwave Technology 32 (3) (2014).
Jung Hojoong et al: "Switchable optical frequency comb in aluminum nitride microring resonator", 2014 Cenference on Lasers and Electro-Optics (CLEO)—Laser Science to Photonic Applications, The Optical Society, Jun. 8, 2014 (Jun. 8, 2014), pp. 1-2, XP032708233, [Retrieved on Dec. 16, 2014] *figure 1e* *the whole document*.
P. Del'Haye et al: "Optical frequency comb generation from a monolithic microresonator", Nature, vol. 450, No. 7173, Dec. 20, 2007 (Dec. 20, 2007), pp. 1214-1217, XP055054533, ISSN: 0028-0836, DOI: 10.1038/nature06401 *figure 2*.
Maddaloni P et al: "Topical Review; Optical comb generators for laser frequency measurement", Measurement Science and Technology, IOP, Bristol, GB, vol. 20, No. 5, May 1, 2009 (May 1, 2009), pp. 52001, XP020152669, ISSN: 0957-0233, DOI: 10.1088/0957-0233/20/5/052001 *the whole document *.
Steve Osterman et al: "<title>A proposed laser frequency comb-based wavelength reference for high-resolution spectroscopy</title>", Medical Imaging 2002: PACS and Integrated Medical Information Systems: Design and Evaluation, vol. 6693, Sep. 12, 2007 (Sep. 12, 2007), pp. 66931G-66931G-9, XP055255574, 1000 20th St. Bellingham WA 98225-6705 USA ISSN: 0277-786X, DOI: 10.1117112.734193 ISBN: 978-1-5106-0167-3 * 4th-6th pages; figure 2 * the whole document*.
Klenner Alexander et al: "21.4 kW peak power from a gigahertz multimode-diode-pumped solid-state laser with carrier envelope offset frequency detection", 2013 Conference on Lasers & Electro-Optics Europe & International Quantum Electronics Conference CLEO Europe/IQEC, IEEE, May 12, 2013 (May 12, 2013), p. 1, CP032588204, DOI: 10.1109/CLEOE-IQEC.2013.6800630 [retrieved on Apr. 17, 2014] *2nd paragraph * the whole document *.
Criado A R et al: "Comparison of Monolithic Optical Frequency Comb Generators Based on Passively Mode-Locked Lasers for Continuous Wave mm-Wave and Sub-THz Generation", Journal of Lightwave Technology, IEEE Service Center, New York, NY, US, vol. 30, No. 19, Oct. 1, 2012 (Oct. 1, 2012), pp. 3133-3141, XP011463774, ISSN: 0733-8724, DOI: 10.1109/JLT.2012. 2211998* III., 2nd par. = p. 3139, left col., 2nd par.; p. 3139* the whole document.
European Search Report Application No. 15192687.0 reported on Mar. 23, 2016.

* cited by examiner

SYSTEM AND METHOD TO PRODUCE TUNABLE SYNTHESIZED OPTICAL FREQUENCY

TECHNICAL FIELD

The present disclosure relates generally to optical synthesis techniques, and more particularly, to apparatus, systems and methods for tunably controlling optical frequencies using a single-frequency laser.

BACKGROUND

As optics-based control systems become increasingly more commonplace, efforts to improve upon optical synthesizers continue to grow. Optical synthesizers generate and output an optical signal having a frequency that is adjusted to a desired frequency. More particularly, the optical signal is derived from an optical source, typically a single-frequency laser or multiple lasers, and a frequency reference which are then processed to output the desired frequency. While various advancements have been made to provide for more accurate and reliable optical synthesizers capable of producing a broader range of output frequencies, there is still much room for improvement in terms of at least efficiency and implementation.

One limitation of conventional optical synthesizers is their reliance on non-integrated systems. Currently available solutions, for instance, rely on input from various external references, such as microwave references, additional optical sources or lasers, modulators, as well as added control circuitry therefor, in order to establish absolute output frequencies. This not only adds to the cost of implementation, but the lack of simplicity prevents for more integrated or on-chip implementations. Furthermore, conventional optical synthesizers rely on light from an external laser source that is frequency-shifted from the comb frequency nearest the desired frequency. Such techniques not only consume much more power than necessary, but can also introduce ambiguities and inaccuracies to the resulting output. These techniques also practically limit the range of output frequencies to the tuning range of the external laser source.

Accordingly, there is a need for improved optical synthesis techniques, which not only provide for integrated or on-chip solutions and produce output over a wider range of output frequencies, but also consume substantially less power without adversely affecting accuracy and reliability.

SUMMARY OF THE DISCLOSURE

In accordance with one aspect of the present disclosure, a control circuit for generating an optical output at a target frequency is provided. The control circuit includes a single-frequency laser configured to generate a source frequency, a micro-ring resonator in communication with the single-frequency laser configured to generate a frequency comb of a plurality of comb frequencies based on the source frequency, a carrier-envelope offset interferometer in communication with the micro-ring resonator configured to determine a carrier-envelope offset frequency of the frequency comb, a tunable filter in communication with the micro-ring resonator configured to select one of the comb frequencies of the frequency comb for output based on the target frequency, and a spectrometer in communication with the tunable filter output configured to resolve ambiguity in overlap between the tunable filter and the plurality of comb frequency produced by the micro-ring resonator and refine the selection of a single comb frequency of the frequency comb for output based on the target frequency.

In accordance with another aspect of the present disclosure, a controller for generating an optical output at a target frequency using a single-frequency laser and a tunable filter is provided. The controller includes a laser module configured to generate a source frequency based at least partially on the target frequency, a resonator module configured to generate a frequency comb of a plurality of comb frequencies based on the source frequency, a carrier-envelope offset module configured to determine a carrier-envelop offset frequency of the frequency comb, and a filter module configured to select one of the comb frequencies of the frequency comb for output based on the target frequency.

In accordance with a further aspect of the present disclosure, a controller-implemented method of generating an optical output at a target frequency using a single-frequency laser and a tunable filter is provided. The controller-implemented method includes operating the single-frequency laser to generate a source frequency based at least partially on the target frequency, generating a frequency comb of a plurality of comb frequencies based on the source frequency, determining a carrier-envelope offset frequency based on the frequency comb, and adjusting a center frequency of the tunable filter so as to output one of the comb frequencies of the frequency comb corresponding to the target frequency.

The features, functions and advantages that have been discussed can be achieved independently in various embodiments or may be combined in yet other embodiments, further details of which can be seen with reference to the following description and drawings.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
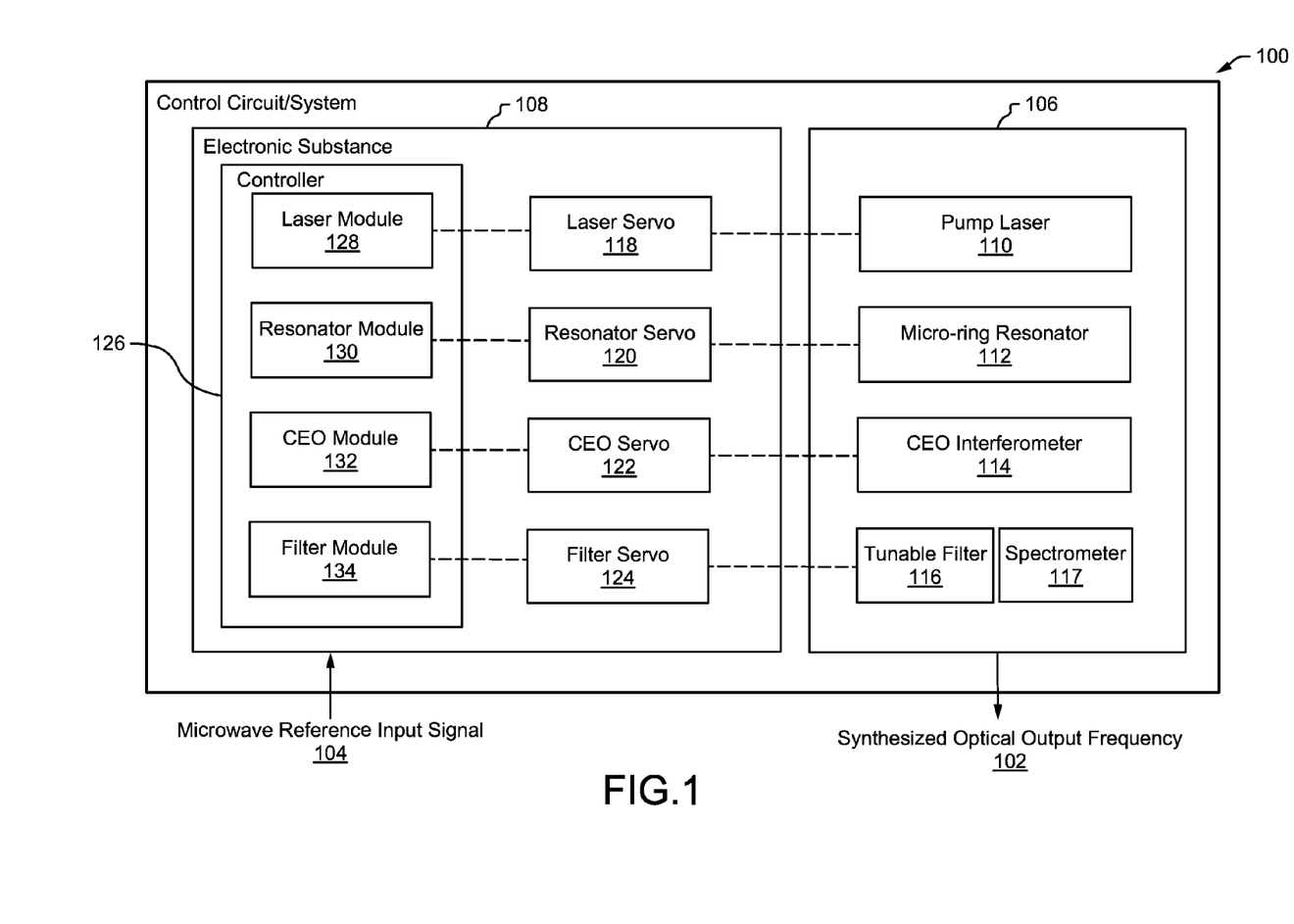
FIG. 1 is a schematic illustration of one exemplary control circuit or system for an optical synthesizer having a tunable output frequency.

Referring now to FIG. 1, one exemplary control circuit or system 100 for an optical synthesizer is provided. As shown, the control circuit 100 may be configured to produce a synthesized optical output signal 102 that is tunable to a desired or target frequency based on internal measurements and a reference input signal 104, such as a microwave reference input signal, or the like. The control circuit 100 generally includes a photonic substrate 106 which generates the optical output signal 102, and a corresponding electronic substrate 108 which controls the manner in which the photonic substrate 106 generates the optical output signal 102. More specifically, the photonic substrate 106 may include at least an optical source, such as a single-frequency pump laser 110, or the like, a resonator, such as a micro-ring resonator 112, or the like, a carrier-envelope offset (CEO) interferometer 114, a tunable filter 116, a spectrometer 117, and any other component suitable for synthesizing the optical output signal 102.

Correspondingly, the electronic substrate 108 in FIG. 1 may include at least a laser servo 118 for operating the pump laser 110, a resonator servo 120 for operating the micro-ring resonator 112, a CEO servo 122 for operating the CEO interferometer 114, a filter servo 124 for operating the tunable filter 116, and any other suitable means for operating components disposed on the photonic substrate 106. Additionally, the electronic substrate 108 further includes at least one controller 126 configured to operate one or more of the pump laser 110, micro-ring resonator 112, CEO interferometer 114 and the tunable filter 116. In the particular embodiment shown, for example, the controller 126 may include at least a laser module 128 that is configured to operate the pump laser 110 via the laser servo 118, a resonator module 130 that is configured to operate the micro-ring resonator 112 via the resonator servo 120, a CEO module 132 that is configured to operate the CEO interferometer 114 via the CEO servo 122, a filter module 134 that is configured to operate the tunable filter 116 via the filter servo 124, a spectrometer 117, and any other suitable means for managing operation of the photonic substrate 106.

Figure 2:
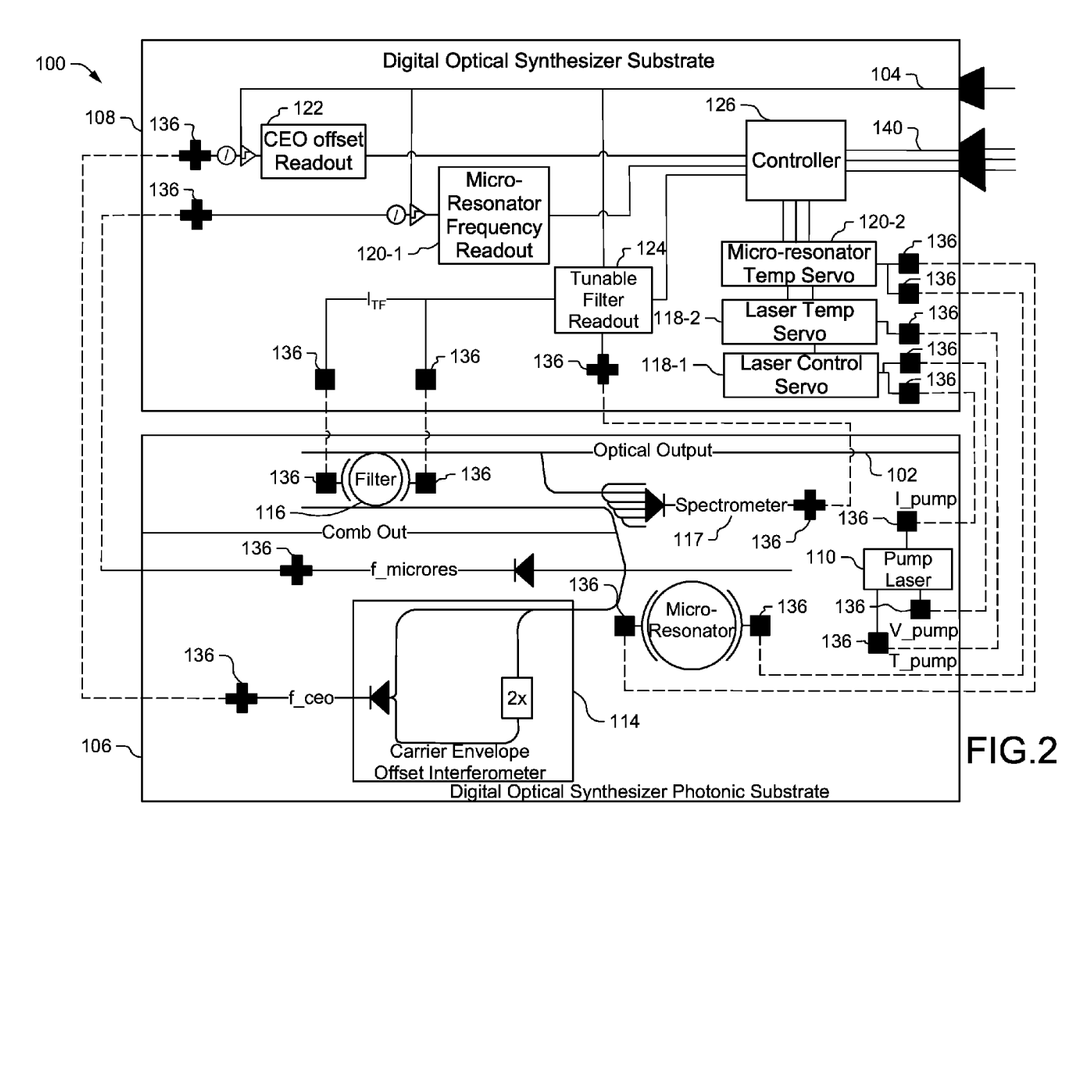
FIG. 2 is a schematic illustration of another exemplary control circuit or system for generating an optical output signal at a target frequency using a single-frequency laser and a tunable filter.

Turning now to FIG. 2, one exemplary implementation of the optical synthesizer system 100 of FIG. 1 is provided having a photonic substrate 106 and an electronic substrate 108. As shown, the photonic substrate 106 of FIG. 2 includes an optical source, for instance, in the form of a pump laser 110 that is configured to supply a source laser having a single frequency. Moreover, the frequency output by the pump laser 110 may be adjustable, for example, approximately between a range of two comb frequencies, or the like, according to the current or voltage supplied thereto and/or the controlled temperature of the pump laser device. The photonic substrate 106 may further include a micro-ring resonator 112 that is disposed in optical communication with the output of the pump laser 110 and configured to receive the laser sourced by the pump laser 110. Based on the laser, the micro-ring resonator 112 may generate a frequency comb, or an optical spectrum of relatively discrete and equally spaced comb lines or comb frequencies, about the frequency of the laser. The spacing or frequency interval between the comb frequencies may be determined based on the temperature and/or any other characteristics or parameters pertaining to the resonator 112.

As shown, the photonic substrate 106 of FIG. 2 further includes a CEO interferometer 114 that is disposed in optical communication with an output of the micro-ring resonator 112, such as via a bus input waveguide, or the like. In general, the CEO interferometer 114 serves to examine the frequency comb provided by the resonator 112, and determine a CEO frequency, or the offset in frequency between the envelope wave and the carrier wave therein. Using a self-referencing scheme, for example, the CEO interferometer 114 in FIG. 2 may be configured to sample and compare high comb frequencies to low comb frequencies within the frequency comb, to determine if the comb frequencies are Fourier multiples of one another and if an absolute frequency grid has been established. Moreover, based on the CEO frequency provided by the CEO interferometer 114, adjustments can be made in the pump laser 110 and/or the micro-ring resonator 112 until such an absolute frequency grid is established. The photonic substrate 106 additionally includes a tunable filter 116 that is also in optical communication with the output of the resonator 112. In particular, the filter 116 may be provided with a tunable center frequency that is configured to filter the frequency comb and select one or more of or a subset of the comb frequencies for output based on a given reference input signal 104 and according to the target frequency. A spectrometer 117 in optical communication with the output of the tunable filter 116 provides unambiguous determination of the location of the center frequency thereof.

Still referring to FIG. 2, the electronic substrate 108 includes a plurality of nodes 136, such as terminals, pads, connections, or the like, by which the electronic substrate 108 interfaces and communicates with corresponding components of the photonic substrate 106. The electronic substrate 108 may further include a port 138 through which the control circuit 100 may communicate with any external or peripheral devices and/or connect to a power supply. Additionally, the electronic substrate 108 is provided with a controller 126 that is in electrical communication with each of a laser servo 118, a resonator servo 120, a CEO servo 122, and a filter servo 124, and configured to receive feedback signals from and/or transmit control signals to the corresponding components of the photonic substrate 106 according to one or more algorithms preprogrammed therein. As conceptually illustrated in FIG. 1, for instance, the preprogrammed algorithms may generally be categorized into modules, such as a laser module 128, a resonator module 130, a CEO module 132, a filter module 134, and the like. Moreover, the controller 126 may be implemented using one or more microcontrollers, processors, microprocessors, field programmable gate arrays (FPGAs), digital signal processors (DSPs), or the like.

As shown in FIG. 2, the laser servo 118 may include a laser control servo 118-1 and a laser temperature servo 118-2, each of which operates in response to control signals provided by the controller 126 and interfaces with the pump laser 110 to maintain a substantially stable laser output. More specifically, the laser control servo 118-1 may supply the appropriate voltage and current to the pump laser 110, and the laser temperature servo 118-2 may control a temperature of the pump laser 110 to compensate for any changes in ambient temperature. The resonator servo 120 may include a resonator frequency servo 120-1 and a resonator temperature servo 120-2. The resonator frequency servo 120-1 may be used to communicate to the controller 126 a feedback signal relating to the frequency comb, such as the comb spacing or frequency interval and/or a comparison between the comb frequency interval and the reference input signal 104. The resonator temperature servo 120-2 may be used to adjust the frequency comb output by the micro-ring resonator 112 via temperature control.

The electronic substrate 108 of FIG. 2 further includes a CEO offset servo 122 which provides a feedback interface between the controller 126 and the CEO interferometer 114 of the photonic substrate 106. For example, the CEO offset servo 122 may receive a feedback signal from an output the CEO interferometer 114 indicative of the CEO frequency, and communicate the CEO frequency information to the controller 126. The CEO servo 122 may additionally provide the controller 126 with any information indicative of how the CEO frequency compares relative to the reference input signal 104. Based on the information provided by the CEO servo 122, the controller 126 may determine if an absolute frequency grid has been established, and if not, adjust control of the pump laser 110 and/or micro-ring resonator 112 accordingly until an absolute frequency grid is achieved. Furthermore, the filter servo 124 may be provided to adjust the final frequency of the optical output signal 102 to the target frequency. For example, the filter servo 124 may receive the reference input signal 104 and a feedback signal relating to the current center frequency setting of the tunable filter 116. Based on comparisons between the reference input signal 104 and the center frequency setting, and based on any control signals provided by the controller 126, the filter servo 124 may adjust the center frequency of the tunable filter 114 to coincide with the single comb frequency best approximating the target frequency.

Figure 3:
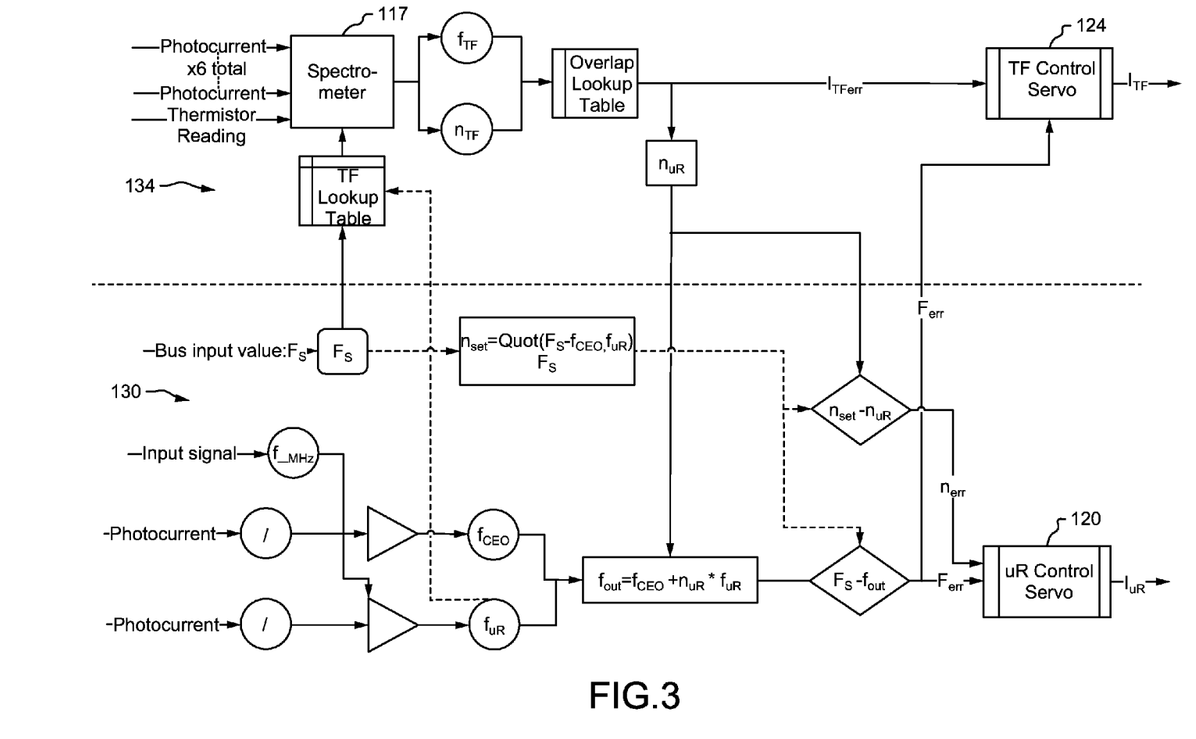
FIG. 3 is a diagrammatic illustration of one control system for implementing a micro-ring resonator module and a tunable filter module.

With further reference to FIG. 3, one possible implementation of, for example, the resonator module 130 and the filter module 134 of the controller 126, is diagrammatically provided. In general, the resonator module 130 may receive measurements taken from the photonic substrate 106, such as the CEO frequency, $f_{CEO}$, and the micro-ring resonator frequency, $f_{\mu R}$, through the inputs of the controller 126. The resonator module 130 may further receive additional information through other inputs of the controller 126 and/or via calculations performed within the controller 126. For example, the resonator module 130 may receive information relating to the frequency comb output by the micro-ring resonator 112, such as the frequency of the bus input to the tunable filter 116, $F_s$, or the like, to be used as a control input value by which the output frequency may be determined. The resonator module 130 may also receive information relating to the present state of the tunable filter 116, such as a current signal, $I_{TFerr}$, or the like, which may be indicative of any mismatch between the center frequency of the tunable filter 116 and the comb frequency corresponding to the target frequency.

Based on the inputs shown for example in FIG. 3, the resonator module 130 may be configured to determine any deviation, such as error frequency value, $F_{err}$, between the bus input frequency, $F_s$, and the resulting output frequency, $f_{out}$, and output the appropriate signals to the resonator servo 120 so as to enable the resonator servo 120 to make the appropriate adjustments to the micro-ring resonator 112. The filter module 134 may similarly receive measurements taken from the photonic substrate 106 through inputs of the controller 126 and/or via calculations performed within the controller 126. For example, based on the bus input frequency, $F_s$, micro-ring resonator frequency, $f_{\mu R}$, outputs of individual channels of the spectrometer 117, and one or more predetermined lookup tables, or the like, the filter module 134 may be configured to determine the current signal, $I_{TFerr}$, which may correspond to any deviations between the center frequency of the tunable filter 116 and the comb frequency corresponding to the target frequency. Furthermore, based on the current signal, $I_{TFerr}$, output by the filter module 134, and in conjunction with any other deviations calculated by the controller 126, such as the error frequency value, $F_{err}$, the filter servo 124 may be capable of adjusting the center frequency of the tunable filter 116 to better approximate the target frequency.

Figure 4:
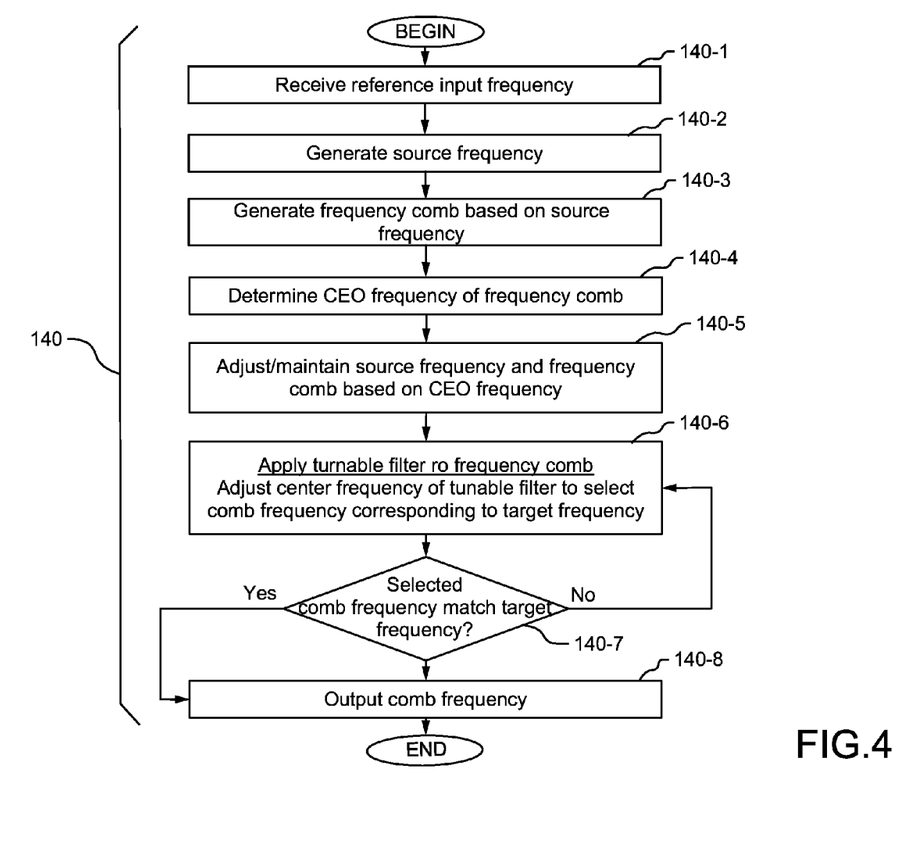
FIG. 4 is a flowchart of one exemplary algorithm or method that may configure a control system or a controller thereof to generate an optical output signal at a target frequency using a single-frequency laser and a tunable filter.

Turning now to FIG. 4, one exemplary algorithm or controller-implemented method 140 for generating an optical output signal 102 at a target frequency is diagrammatically provided, according to which, for example, the control system 100 or the controller 126 thereof may be configured to operate. As shown, the controller 126 according to block 140-1 may be configured to receive information pertaining to the frequency of a reference input signal 104 which may be used as a common reference for other signals provided within the control system 100. For example, the reference input signal 104 may be a microwave reference input, or any other suitably stable input signal received from a global positioning system (GPS), an atomic clock, or the like. In block 140-2, the controller 126 may be configured to generate a source frequency, such as via control of a single-frequency laser 110, or the like, based at least partially on the reference input signal 104. Based on the laser output of the single-frequency laser 110, the controller 126 in block 140-3 may be configured to generate a frequency comb, such as an optical spectrum of relatively discrete and equally spaced comb lines or comb frequencies about the laser frequency. Moreover, the controller 126 may generate the frequency comb using, for example, a micro-ring resonator 112, or the like, that is coupled to an output of a single-frequency laser 110 as shown in FIG. 2.

In block 140-4, the controller 126 may be configured to determine the CEO frequency of the frequency comb generated in block 140-3. As shown in FIG. 2 for example, the controller 126 may employ a CEO interferometer 114 that is disposed in optical communication with an output of a micro-ring resonator 112 to determine a CEO frequency, or the offset in frequency between the envelope wave and the carrier wave therein. Using a self-referencing scheme, for example, the controller 126 may sample and compare high comb frequencies to low comb frequencies to determine if the comb frequencies are Fourier multiples of one another and if an absolute frequency grid has been established. Based on the CEO frequency then, the controller 126 in block 140-5 may be capable of adjusting control to the pump laser 110 and/or the associated resonator 112 to achieve or maintain an absolute frequency grid. Furthermore, the controller 126 in block 140-6 may be configured to apply a filter to the frequency comb so as to enable the selected one of the comb frequencies to be output as the optical output signal 102.

In particular, the controller 126 according to block 140-6 may select the appropriate comb frequency, for example, by controlling or adjusting the center frequency of a tunable filter 116 that is also in optical communication with the output of the resonator 112. The controller 126 may be configured to determine whether the comb frequency selected in block 140-6 substantially and unambiguously matches the target frequency in block 140-7. The determination of whether the center frequency of the tunable filter 116 matches the target frequency utilizes a spectrometer 117 in optical communication with the output of the tunable filter 116. The spectrometer 117 will allow unambiguous and self-contained determination of the location of the frequency overlap of the output of the tunable filter 116 and the comb frequencies or comb lines provided by the micro-ring resonator 112. If the selected comb frequency for a given iteration does not substantially match the target frequency, the controller 126 may return to block 140-6 so as to readjust the center frequency of the tunable filter 116 and filter the frequency comb again. The controller 126 may repeat this loop at least until the controller 126 determines that the selected comb frequency substantially matches the target frequency in block 140-7. If the selected comb frequency substantially matches the target frequency, the controller 126 may be configured to output the selected comb frequency as the optical output signal 102 according to block 140-8.

It will be appreciated that the foregoing description provides examples of the disclosed apparatus, systems and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A synthesizer system for generating an optical output at a target frequency, comprising:
    a micro-ring resonator configured to generate a frequency comb of a plurality of comb frequencies based on a source frequency;
    a carrier-envelope offset interferometer configured to determine a carrier-envelope offset frequency of the frequency comb;
    a tunable filter configured to select a subset of comb frequencies of the frequency comb based on the target frequency; and
    a spectrometer configured to select a single comb frequency for output based on the subset of comb frequencies.

2. The synthesizer system of claim 1, wherein the micro-ring resonator is configured to adjust the frequency comb based at least partially on the carrier-envelope offset frequency and the target frequency.

3. The synthesizer system of claim 1, wherein the carrier-envelope offset interferometer is configured to determine the carrier-envelope offset frequency based on a self-referencing scheme.

4. The synthesizer system of claim 1, wherein a frequency value corresponding to an overlap between the subset of comb frequencies and the frequency comb is unambiguously determined at least partially by the spectrometer and adjustments made to a center frequency of the tunable filter.

5. The synthesizer system of claim 1, wherein the source frequency is generated by a single-frequency laser and the target frequency corresponds to a microwave reference input signal.

6. The synthesizer system of claim 1, wherein each of the micro-ring resonator, the carrier-envelope offset interferometer, and the tunable filter is disposed on a photonic substrate, and each of the micro-ring resonator, the carrier-envelope offset interferometer, and the tunable filter is operated at least in part by a corresponding servo disposed on an electronic substrate.

7. The synthesizer system of claim 6, wherein the electronic substrate includes at least a laser servo, a resonator servo, a carrier-envelope offset servo, a filter servo, and a controller configured to operate each of the laser servo, the resonator servo, the carrier-envelope offset servo, and the filter servo.

8. A controller for generating an optical output at a target frequency using a single-frequency laser and a tunable filter, comprising:
    a laser module configured to generate a source frequency based at least partially on the target frequency;
    a resonator module configured to generate a frequency comb of a plurality of comb frequencies based on the source frequency;
    a carrier-envelope offset module configured to determine a carrier-envelop offset frequency of the frequency comb; and
    a filter module operatively coupled to a spectrometer configured to select one of the comb frequencies of the frequency comb for output based on the target frequency.

9. The controller of claim 8, wherein the laser module is operatively coupled to the single-frequency laser, the resonator module is operatively coupled to a micro-ring resonator, the carrier-envelope offset module is operatively coupled to a carrier-envelope offset interferometer, the filter module is operatively coupled to the tunable filter.

10. The controller of claim 9, wherein the laser module operates the single-frequency laser via a laser servo, the resonator module operates the micro-ring resonator via a resonator servo, the carrier-envelope offset module operates the carrier-envelope offset interferometer via a carrier-envelope offset servo, and the filter module operates the tunable filter via a filter servo.

11. The controller of claim 8, wherein the resonator module is configured to adjust the frequency comb based at least partially on the carrier-envelope offset frequency and the target frequency.

12. The controller of claim 8, wherein the carrier-envelope offset module is configured to determine the carrier-envelope offset frequency based on a self-referencing scheme.

13. The controller of claim 8, wherein the filter module is configured to adjust a center frequency of the tunable filter so as to output one of the comb frequencies of the frequency comb corresponding to the target frequency.

14. The controller of claim 8, wherein the target frequency corresponds to a microwave reference input signal.

15. A controller-implemented method of generating an optical output at a target frequency using a single-frequency laser and a tunable filter, comprising:
    operating the single-frequency laser to generate a source frequency based at least partially on the target frequency;
    generating a frequency comb of a plurality of comb frequencies based on the source frequency;

determining a carrier-envelope offset frequency based on the frequency comb; and adjusting a center frequency of the tunable filter using an integrated spectrometer so as to output one of the comb frequencies of the frequency comb corresponding to the target frequency.

16. The controller-implemented method of claim 15, wherein the frequency comb is adjusted based at least partially on the source frequency.

17. The controller-implemented method of claim 15, wherein the frequency comb is adjusted based at least partially on the carrier-envelope offset frequency.

18. The controller-implemented method of claim 15, wherein the frequency comb is adjusted based at least partially on measurements made by the integrated spectrometer.

19. The controller-implemented method of claim 15, wherein the frequency comb is generated using a micro-ring resonator.

20. The controller-implemented method of claim 15, wherein the carrier-envelope offset frequency is determined based on a self-referencing scheme.

* * * * *